March 3, 1970  F. PFISTER ET AL  3,498,416
DAMPING DEVICE FOR OBJECT TRACKING MEANS
Filed May 16, 1968
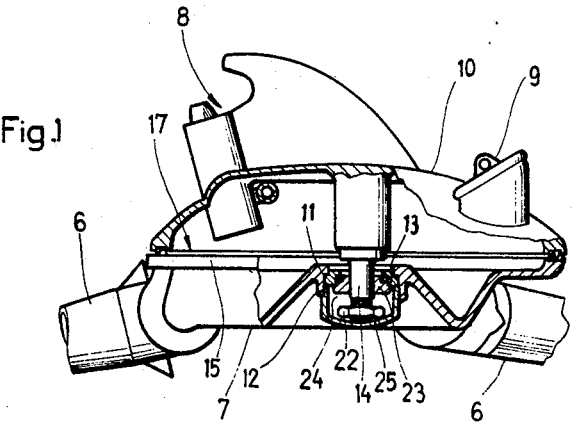
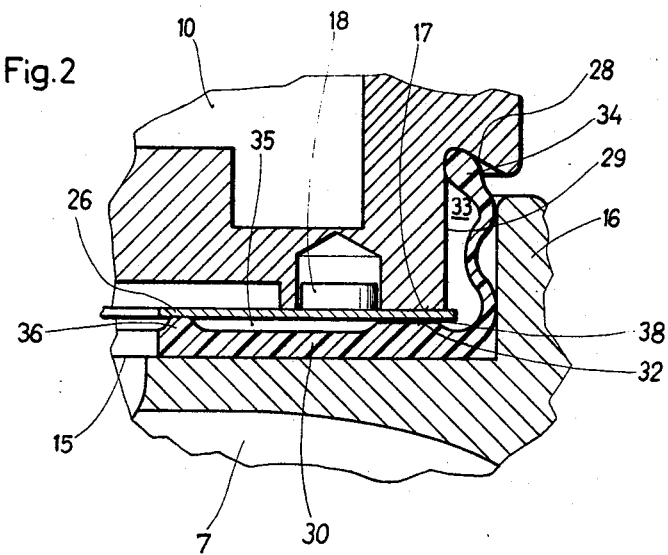
INVENTORS
Franz Pfister
Eicke Maus
Josef Durner
Anton Schipf
ATTORNEYS United States Patent Office 3,498,416
Patented Mar. 3, 1970

3,498,416
DAMPING DEVICE FOR OBJECT TRACKING MEANS
Franz Pfister, Hochstadt, Eicke Maus and Josef Durner, Ottobrunn, and Anton Schipf, Munich, Germany, assignors to BOLKOW Gesellschaft mit beschrankter Haftung, Ottobrunn, near Munich, Germany
Filed May 16, 1968, Ser. No. 729,575
Claims priority, application Germany, Mar. 20, 1968, 1,773,004
Int. Cl. F16f 11/00
U.S. Cl. 188—1                                  9 Claims

ABSTRACT OF THE DISCLOSURE

A damping device, for regulating the relative angular velocity of two relatively rotatable members, includes two bearing members having slidably engaged bearing surfaces. One surface comprises tetrafluorethylene and the other surface is a polished steel surface. A film of highly viscous and temperature-resistant oil is interposed between the sliding surfaces. Adustable spring means control the contact pressure of the surfaces, and the area of the surfaces as well as the spring pressure are so selected, relative to the preselected relative angular velocity that the relative angular velocity is maintained below 30 m./min.

CROSS REFERENCE TO RELATED APPLICATION

The damping device of the present invention is a further development of the damping device disclosed in copending application Ser. No. 722,122, filed Apr. 17, 1968, for "Damping Arrangement for Tracking Device."

BACKGROUND OF THE INVENTION

The above-mentioned copending patent application discloses a damping device designed as a journal bearing having at least one sliding surface consisting of a carbon fluoride resin, such as tetrafluorethylene, with the engaging bearing surface constituted by a polished steel surface. The contact pressure between the slidably engaged bearing surfaces is adjustable through an adjustable accumulator, such as spring means and associated spring adjusting means. The dimensions of the slidably engaged surfaces, and the spring pressure controlling the contact pressure therebetween, are selected in accordance with the preselected maximum relative angular velocity of the two relatively rotatable parts whose velocity is controlled by the damping device, in such a manner that the maximum relative surface velocity between the two slidably engaged bearing surfaces is always maintained below 30 m./min.

In practical applications, it has been demonstrated that, while the damping device disclosed in the mentioned copending application has equally good damping qualities over a wide temperature range, and is insensitive to the influence of moisture, there is noticeable, upon the first operation of the parts after shorter or longer interruptions, a marked starting jerk. This jerk disappears only after repeated directional reversal of the two parts of the tracking device or the like which are movable relative to each other and whose relative maximum velocity is controlled by the damping device.

SUMMARY OF THE INVENTION

This invention relates to damping devices and, more particularly to a novel and improved damping device for controlling the maximum angular velocity of means for tracking a moving object, such as a target tracking device associated with launching apparatus for jet-propelled guided missiles.

In accordance with the invention, a damping device of the type disclosed in the above-mentioned copending U.S. patent application is improved, as to its operational qualities, by interposing an oil film of highly viscous and temperature-resistant oil between the sliding surfaces of the journal bearing. Surprisingly, not only does the undesirable starting jerk, i.e., the adhesive effect at the start of a motion, disappear when such an oil film is interposed, but the damping qualities of the journal bearing are considerably improved. The damping becomes approximately speed-dependent, which is most advantageous in means for tracking a moving object by line of sight.

Test have shown that the provision of an oil film between the sliding surfaces of the journal bearing has particularly favorable results when, in accordance with a further feature of the invention, that member of the journal bearing having a bearing surface of a carbon fluoride consists of a dry mixture of 75% tetrafluorethylene and 25% carbon graphite.

In a preferred embodiment of the invention, the carbon fluoride sliding or bearing surface is the annular area, lying in a diametric plane, of a ring which is approximately L-shaped in cross section, this ring being disposed in one part of the tracking means or device. The part of the L-shaped ring adjacent to such circular area forms an undulating or wavey sealing lip enclosing a hollow space. The part including the sealing area is formed with another sealing lip enclosing another hollow space adjacent to the circular area. The other sliding or bearing surface of the tracking device or the like is a polished circularly annular area of a thin steel ring disposed in such other part of the device. The hollow spaces enclosed by the sealing lips and confined by the steel ring, or that part of the tracking device supporting the steel ring, are filled with silicon oil.

Such a journal bearing design has the advantage that, by means of a single component, namely the tetrafluorethylene ring, the interengaged sliding surfaces are sealed against the external atmosphere and that the reservoirs to receive the silicon oil, required for formation of an oil film between the sliding surfaces, are formed simultaneously in cooperation with one component of the tracking device or the like. It is further assured, due to the oil-filled hollow spaces adjacent to both sides of the circular area, that, regardless of the position the device may have assumed during transportation, there will always be a relatively thin oil film between the tetrafluorethylene and polished steel bearing surfaces when the device is put in operation.

An object of the present invention is to provide an improved damping device, particularly for means for tracking moving objects by the line of sight.

Another object of the invention is to provide such a damping device including two interengaged sliding surfaces, one constituted by a carbon fluoride resin and the other constituted by a polished steel surface, and in which a film of highly viscous and temperature-resistant oil is interposed between the sliding surfaces.

A further object of the invention is to provide such a damping device in which the sliding or bearing surface formed of a carbon fluoride resin consists of a dry mixture of 75% tetrafluorethylene and 25% carbon graphite.

Yet, another object of the invention is to provide such a damping device in which the two bearings of a journal bearing constituting the damping device form reservoirs for the oil, which is preferably a silicon oil.

A further object of the invention is to provide such a damping device in which the adhesive effect, at the start of movement of two relatively movable members, is eliminated and there is no undesirable starting jerk.

Another object of the invention is to provide such a damping device in which the damping is approximately speed-dependent.

BRIEF DESCRIPTION OF THE DRAWINGS

For an understanding of the principles of the invention, reference is made to the following description of a typical embodiment thereof as illustrated in the accompanying drawings.

In the drawings:

FIG. 1 is a partial side elevation view, partially broken away and partially in section, of target tracking means for a missile launching apparatus, embodying a damping device in accordance with the present invention; and FIG. 2 is an enlarged partial sectional view through the damping device.

DESCRIPTION OF THE PREFERRED EMBODIMENT

As in the above-mentioned patent application, the damping device will be described in connection with a support or a launching device for jet-propelled guided missiles, although it should be understood that the damping device is by no means limited to this particular application which is selected by way of example only.

The stand essentially comprises a lower part 7 having swiveling support legs 6 and an upper cover-shaped part 10 having fastening means 8 and 9 for the launching apparatus, which has not been illustrated as it forms no part of the invention. Adjacent its center, lower part 7 has a bushing or tubular extension 12 with a bore 11 receiving a ball bearing 13 disposed on a central bearing pin 17 of upper part 10 and which extends through bushing 12. The bearing between bore 11 and pin 14 could be a bearing formed of tetrafluorethylene.

Lower part 7 has a circularly annular area 15 concentric with bushing 12, and, as viewed in FIG. 1, area 15 faces upwardly and is bounded by a shoulder 16. The essentially rotation-symmetrical upper part 10, which is rotatably mounted in lower part 7 through the provision of ball bearing assembly 13, has a circularly annular area 17 aligned with the area 15 of lower part 7 and facing downwardly, as viewed in FIG. 1. A steel ring 26 having a polished surface is anchored in areas 17 by means of pins 18 engaged in mating recesses in the upper part 10. In addition, upper part 10 has, at its end facing lower part 7, a shoulder 29 extending, with substantial clearance, into the area defined by shoulder 16 of lower part 7. The upper end of shoulder 29 has a downwardly and outwardly extending annular nose 28 which has a concave juncture with shoulder 29 and a convex lower outer edge. The nose 28 thus defines, with shoulder 29, a downwardly facing recess.

The space between upper part 10 and lower part 7 not occupied by steel ring 26 is essentially filled by a ring 30 which is approximately L-shaped in radial cross section. Ring 30 has, on its surface facing toward upper part 10, the actual circularly annular friction surface 32 engaged with steel ring 26. The outer portion of the ring 30 forms a sealing lip 34 which is wavey or undulating in an axial direction and defines, with shoulder 29, a hollow 33. Sealing lip 34 is engaged in the recess defined by shoulder 29 and annular nose 28, and lip 34 also engages the radially inner surface of shoulder 16. The diametrically extending portion of ring 30 also has a sealing lip 36 engaging steel ring 26 and defining another hollow space 35.

Ring 30 is made of a material consisting of a dry mixture of 75% tetrafluorethylene and 25% carbon graphite. This composition favors build up of oil film 38 when the tracking device is moved, tends to insignificant deformations when the ring is stressed, and has considerably better wearing qualities than pure tetrafluorethylene.

Both hollow spaces 33 and 35 are filled with a highly viscous and temperature-resistant silicon oil so that, regardless of the angular position assumed by the tracking device, the thin oil film 38 can form between friction surface 32 and the polished surface of steel ring 26. At the same time, sealing lips 34 and 36 seal the slidably engaged surfaces against atmosphere and prevent losses of the oil by leakage.

While a specific embodiment of the invention has been shown and described in detail to illustrate the application of the principles of the invention, it will be understood that the invention may be embodied otherwise without departing from such principles.

What is claimed is:

1. A damping device, particularly for use with means for tracking a moving object by line of sight, said damping device comprising, in combination, journal bearing means, including a first bearing member having a first sliding surface consisting of a carbon fluoride resin, and a second bearing member having a second sliding surface engaging said first sliding surface; adjustable accumulator means operatively associated with said bearing members and operable to adjust the contact pressure between said sliding surfaces; the dimensions of said sliding surfaces, and the adjustment of said accumulator means, being selected, in accordance with the predetermined tracking velocity, to maintain the maximum relative surface velocity between said sliding surfaces at less than 30 m./min.; and means providing and maintaining a film of highly viscous and temperature-resistant oil between said sliding surfaces.

2. A damping device, as claimed in claim 1, in which said first sliding surface consists of a dry mixture of 75% tetrafluorethylene and 25% carbon graphite.

3. A damping device, as claimed in claim 1, in which said second sliding surface is the polished surface of a steel ring.

4. A damping device, as claimed in claim 3, in which said first sliding surface consists of a dry mixture of 75% tetrafluorethylene and 25% carbon graphite.

5. A damping device, as claimed in claim 1, in which said journal bearing is included in a tracking device including first and second relatively rotatable parts rotatably interconnected through said journal bearing; said first bearing member comprising a ring which is approximately L-shaped in cross section and engaged in said first part, said first sliding surface comprising a diametrically extending circularly annular area of said ring; the part of said ring adjacent to said circularly annular area comprising an axially undulating and axially extending sealing lip enclosing, with a portion of said first member, a hollow space; said circularly annular area of said ring being formed to define, with said second bearing member, another hollow space; said hollow spaces being filled with said oil which is a silicon oil.

6. A damping device, as claimed in claim 5, in which said second sliding surface is a polished circularly annular area of a thin steel ring positioned in said second part.

7. A damping device, as claimed in claim 6, in which said first rotatable part has a diametrically extending circular area bounded circumferentially by an axially extending shoulder, said diametrically extending circular area receiving the diametrically extending circularly annular area of said first bearing member, and said axially extending shoulder supporting said axially extending sealing lip of said first bearing member.

8. A damping device, as claimed in claim 7, in which said second rotatable part has an axially extending shoulder radially spaced from said axially extending shoulder of said first part and terminating in an annular nose extending radially outwardly and toward the axially outer end of said axially extending shoulder of said first part; said axially extending shoulder of said second part and said nose defining a recess receiving the axially outer end of said sealing lip of said first bearing member.

9. A damping device, as claimed in claim 8, in which said first sliding surface consists of a dry mixture of 75% tetrafluorethylene and 25% carbon graphite.

References Cited

UNITED STATES PATENTS

| | | | |
|---|---|---|---|
| 2,514,138 | 7/1950 | O'Connor | 188—1 |
| 2,896,937 | 7/1959 | Miller | 188—1 X |
| 3,116,813 | 7/1964 | Ziegler | 188—1 |
| 3,237,741 | 3/1966 | Potter et al. | 188—1 X |

DUANE A. REGER, Primary Examiner

U.S. Cl. X.R.

73—430; 248—358